(12) United States Patent
Larsen et al.

(10) Patent No.: US 10,309,835 B2
(45) Date of Patent: Jun. 4, 2019

(54) BODY CORE TEMPERATURE MEASUREMENT

(71) Applicant: Honeywell International Inc., Morris Plains, NJ (US)

(72) Inventors: Christopher Scott Larsen, Plymouth, MN (US); Brian Keith Olmsted, Richfield, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 542 days.

(21) Appl. No.: 15/003,175

(22) Filed: Jan. 21, 2016

(65) Prior Publication Data
US 2017/0211993 A1    Jul. 27, 2017

(51) Int. Cl.
G01J 5/08    (2006.01)
G01J 5/06    (2006.01)
G01J 5/00    (2006.01)

(52) U.S. Cl.
CPC .......... G01J 5/0868 (2013.01); G01J 5/0011 (2013.01); G01J 5/06 (2013.01); G01J 5/0818 (2013.01)

(58) Field of Classification Search
CPC . G01K 13/004; G01K 7/02; G01J 5/06; G01J 5/0011; G01J 5/0868
USPC ................................ 702/131; 374/130, 133
See application file for complete search history.

(56) References Cited

U.S. PATENT DOCUMENTS

| | | | |
|---|---|---|---|
| 4,895,164 A * | 1/1990 | Wood ................ | A61B 5/01 374/124 |
| 4,932,789 A * | 6/1990 | Egawa ................ | G01J 5/02 374/126 |
| 5,012,813 A * | 5/1991 | Pompei ................ | G01J 5/00 374/130 |
| 5,018,872 A | 5/1991 | Suszyuski et al. | |
| 5,167,235 A * | 12/1992 | Seacord ................ | G01J 5/02 374/131 |
| 5,293,877 A * | 3/1994 | O'Hara ................ | G01J 5/02 374/131 |
| 6,425,688 B1 | 7/2002 | Hsu | |

(Continued)

FOREIGN PATENT DOCUMENTS

CN    106539566 A    3/2017
CN    106539567 A    3/2017

(Continued)

OTHER PUBLICATIONS

"U.S. Appl. No. 14/386,671, Non Final Office Action dated Nov. 30, 2017", 12 pgs.
"U.S. Appl. No. 14/862,671, Notice of Allowance dated May 22, 2018", 8 pgs.
"U.S. Appl. No. 14/862,671, Response filed Feb. 14, 2018 to Non Final Office Action dated Nov. 30, 2017", 8 pgs.

(Continued)

*Primary Examiner* — Vu A Le
(74) *Attorney, Agent, or Firm* — Alston & Bird LLP

(57) ABSTRACT

An apparatus for measuring body core temperature includes a light guide with an internally reflective tube. The light guide is coupled to an earpiece, and has a lens or an aperture positioned at one of its ends. A sensor is positioned at the other end of the light guide, and a processor is coupled to the sensor. The sensor senses infrared radiation from an infrared source at the end of the light guide, and the processor determines a temperature of the infrared source at the end of the light guide via a transfer function that correlates a measure of the infrared radiation observed by the sensor and an effect of radiation of the light guide.

19 Claims, 6 Drawing Sheets

(56) References Cited

U.S. PATENT DOCUMENTS

| | | | |
|---|---|---|---|
| 6,522,912 B1 | 2/2003 | Nakatani et al. | |
| 6,572,264 B1* | 6/2003 | Egawa | G01J 5/0003 |
| | | | 374/126 |
| 6,631,287 B2* | 10/2003 | Newman | G01J 5/02 |
| | | | 374/124 |
| 6,898,457 B1 | 5/2005 | Kraus et al. | |
| 7,048,437 B2 | 5/2006 | Bellifernine | |
| 7,813,889 B2 | 10/2010 | Quinn et al. | |
| 7,988,352 B2 | 8/2011 | Lin et al. | |
| 2009/0207882 A1 | 8/2009 | Yu | |
| 2013/0218022 A1* | 8/2013 | Larsen | A61B 5/01 |
| | | | 600/474 |
| 2014/0005497 A1 | 1/2014 | Larsen | |
| 2015/0088028 A1 | 3/2015 | Ledoux | |
| 2017/0079532 A1* | 3/2017 | Larsen | G01K 13/004 |
| 2017/0082496 A1* | 3/2017 | Larsen | G01J 5/0818 |
| 2017/0258329 A1 | 9/2017 | Marsh | |

FOREIGN PATENT DOCUMENTS

| | | |
|---|---|---|
| DE | 19857148 A1 | 3/2000 |
| JP | 2000-152916 A | 6/2000 |
| WO | WO-2006/091106 A1 | 8/2006 |
| WO | WO-2006112837 A1 | 10/2006 |

OTHER PUBLICATIONS

"U.S. Appl. No. 14/862,743, Non Final Office Action dated Nov. 16, 2017", 12 pgs.

"U.S. Appl. No. 14/862,743, Notice of Allowance dated Jun. 4, 2018", 9 pgs.

Palese, Alvisa, "The Effects of Earphones and Music on the Temperature Measured by Infared Tympanic Thermometer: Preliminary Results", ORL—Head and Neck Nursing 32, No. 2, (2014), 8-12.

\* cited by examiner

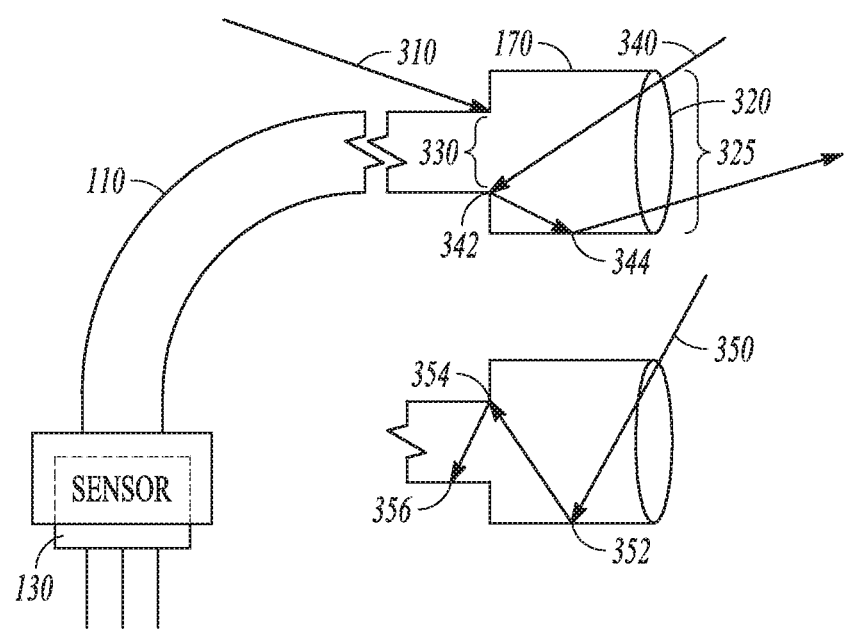
FIG. 3
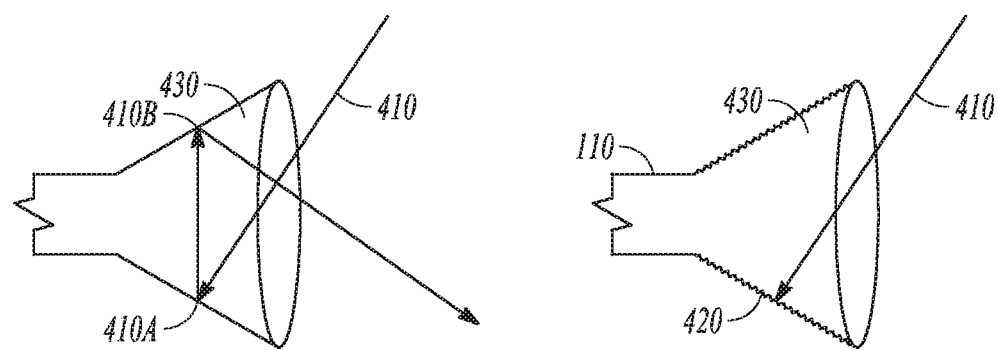
FIG. 4
FIG. 4A

BODY CORE TEMPERATURE MEASUREMENT

GOVERNMENT FUNDING

This invention was made with Government support under contract number W911NF-14-C-0044 awarded by the U.S. Army and the Defense Advanced Research Projects Agency (DARPA). The United States Government has certain rights in this invention.

TECHNICAL FIELD

The present disclosure relates to body core temperature measurement.

BACKGROUND

Continuous or spot measurements of body core temperature through tympanic membrane (eardrum) thermometry generally require unrestricted access to the ear canal so that the temperature sensor's field of view can be completely filled by the tympanic membrane. In cases where the ear canal is obstructed by other components, or the subject presents different physiology, it can be very challenging for the temperature sensor itself (e.g., a thermopile) to reach all the way to the eardrum. As the standoff distance from the eardrum increases, the percentage of the region of interest diminishes as the square of the standoff distance, thereby rapidly increasing the difficulty in obtaining a reliable reading with a high degree of confidence. There is therefore a need for an optical design that allows the sensor to be located less deeply into the ear canal or even outside the ear canal, and yet still allows for the sensor's field of view to be substantially filled by the tympanic membrane.

BRIEF DESCRIPTION OF THE DRAWINGS

FIG. 3 illustrates another embodiment of a system and apparatus that is placed into an ear and that determines a body core temperature wherein a light guide includes a step change in diameter.

FIG. 4 illustrates another embodiment of a system and apparatus that is placed into an ear and that determines a body core temperature wherein a light guide includes a flared section.

FIG. 4A illustrates another embodiment of a system and apparatus that is placed into an ear and that determines a body core temperature wherein a light guide includes a flared section that includes an absorbing or reflecting surface.

DETAILED DESCRIPTION

Figure 1:
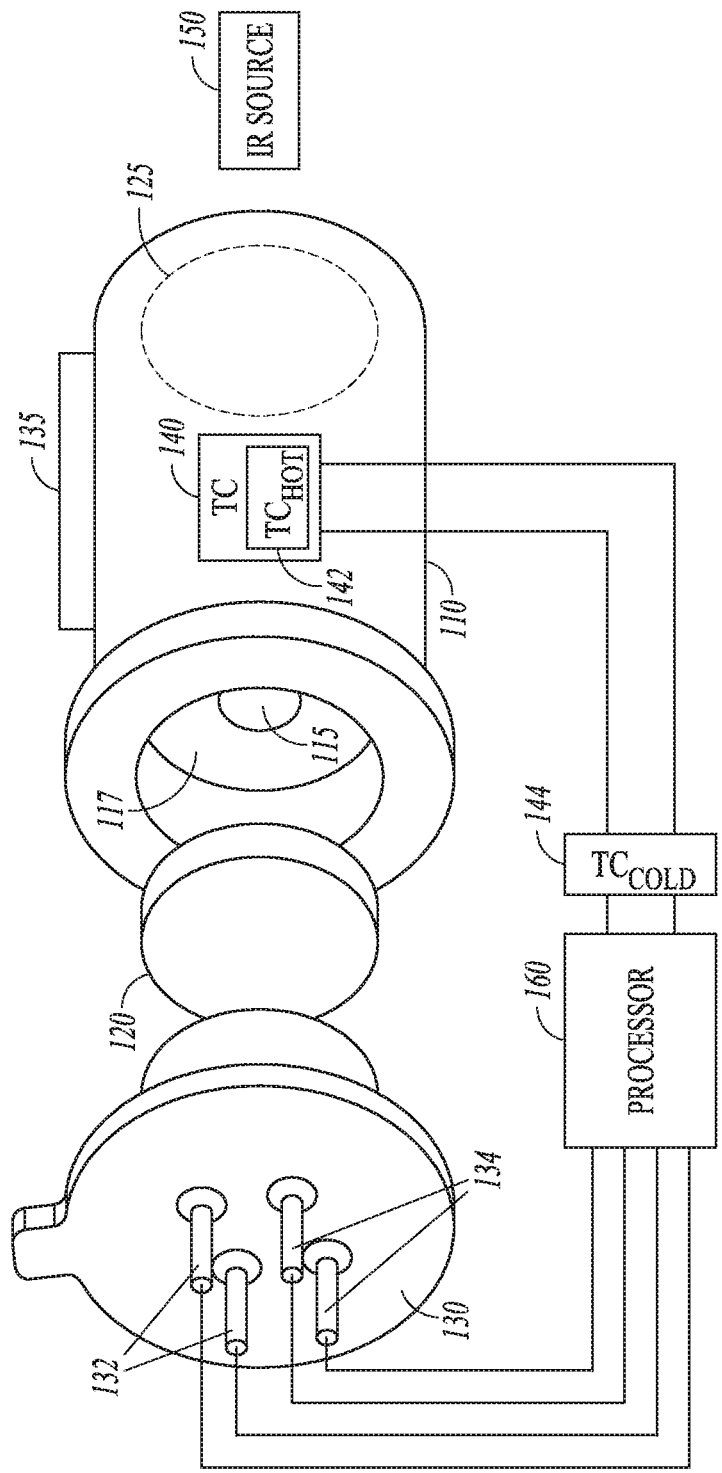
FIG. 1 illustrates an embodiment of a system and apparatus that is placed into an ear and that determines a body core temperature.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

As noted above, there is a need for continuous body core temperature monitoring. In an embodiment, this need is addressed with a device that can be coupled to an earpiece in the ear canal. The device can also be a standalone independent device. Whether a standalone device or coupled to an existing earpiece, the device is configured to be placed in an ear and retained in the ear. When used in conjunction with an existing earpiece (such as a communication device), the existing earpiece may have a hollow tube for sound conduction of audio in and out of the ear. However, the hollow tube of the existing earpiece and an associated sound sealing earplug leave little room for a thermopile sensor to go all the way in the ear canal to reach the tympanic membrane. Therefore, in an embodiment, an optical system is used that consists of a light guide and an optional lens. The light guide may be a hollow reflective tube, an optic fiber, or any other substance through which light and/or infrared radiation may propagate. When implemented with an existing earpiece, the light guide can be positioned next to and parallel to the hollow sound tube within the earpiece. The light guide is highly reflective to the long wave infrared (LWIR) radiation from the tympanic membrane, and guides the LWIR to the thermopile sensor (or other detector). In an embodiment, the light guide is much narrower in diameter than the thermopile itself, allowing use of a large, standard size (e.g., 4.6 mm diameter) thermopile with higher sensitivity, while still fitting in the ear canal alongside the other components (sound tubes, earplugs, etc.).

The light waveguide can be a rigid or a flexible tube with an LWIR reflective interior, for example, a reflective coating. In an embodiment, the waveguide's reduction in diameter from the thermopile diameter to the final exit diameter of the waveguide presents a flat surface to the thermopile sensor (i.e., a step change in diameter, as contrasted with a non-step change diameter that would be associated with a waveguide whose end was flared or tapered out at the thermopile sensor). In this way, the surface area of the waveguide viewed by the sensor is minimized, and the thermopile views the following objects—the flat surface of the waveguide where the diameter is reduced from the thermopile diameter to the waveguide tube diameter, a small spot of the eardrum as viewed via an optical ray straight through the waveguide, and the waveguide walls, which present a mix of reflections of the eardrum and the thermal radiation of the waveguide walls.

An embodiment limits the acceptance angle of the light going into the light guide. The acceptance angle, or numerical aperture, of the light guide should be limited where light enters, or the risk is that the ear canal will be included in the measurement. The light guide should not only direct light from the eardrum, it should limit its own field of view to only image the eardrum by design. This embodiment includes methods for doing so. An additional issue with the hollow core light guide is that dirt and debris can enter a hollow light guide. This dirt and debris will emit its own infrared (IR) light, in accordance with its temperature and emissivity. In this case, the sensor will see a combination of IR radiation from the eardrum and the debris, reducing the accuracy of the eardrum temperature measurement.

By limiting the field of view of the entrance of the light guide, only the eardrum should be imaged, with the resulting masked region in the sensor field of view equivalent to a known standard close to the temperature of a thermopile itself. This results in a temperature read out of the tympanic membrane that is much more accurate. By eliminating the possibility of debris entry from the eardrum side, dirt, skin, and other debris will not be able to enter the light guide, allowing for more accurate measurement over a longer period of time, and allowing the light guide to be cleaned and reused indefinitely. Additionally, an embodiment enables the possibility of employing more flexible fiber optic bundles, increasing the users comfort for wearing a light guide in the ear canal.

An embodiment includes placing a lens, such as a simple ball lens, inside the entrance side of a hollow tube light guide in order to reduce the numerical aperture of the light guide and to protect the light guide from debris. Other lens shapes could be used depending on the optical constraints or requirement for a given measurement geometry, if desired. The entire light guide can also be filled with a LWIR-transmissive material, and the end can be shaped to reduce the numerical aperture of the light guide itself. In an embodiment, the entire light guide could be effectively an optical fiber or fiber bundle with total internal reflection guiding the light down the path of the channel. This can be a suitable application for a hollow core photonic bandgap crystal fiber or fiber bundle, such as the Honeywell COUGAR™ fiber, which was developed under a DARPA contract. One issue with adding mass to the light guide might be that it will allow a larger thermal gradient, possibly affecting the accuracy of the measurement. In such a case, as is described elsewhere in this disclosure, the thermocouple measurement can compensate for how that thermal gradient affects the overall measurement, allowing the measurement to remain accurate. Also, the thermal gradient issue associated with the mass of the fiber/fiber bundle can be offset or mitigated by the use of a hollow core photonic bandgap crystal fiber, such as Honeywell's aforementioned COUGAR™ fiber. These fibers consist of very small hollow fibers arranged to confine light traveling through air in the free space of the core by propagating the light transmission through total internal reflection, without absorption. These fibers are constructed largely of air, which makes for a very low mass optical fiber design, and which accompanies a thermal gradient with a sharper cutoff and extinction along the axis of the fiber/fiber bundle.

As noted above, the acceptance angle or numerical aperture of the light going into the light guide should be reduced, or IR radiation from the ear canal will be included in the measurement. The light guide should therefore not only direct light from the eardrum, it should by design limit its own field of view to only image the eardrum. Several embodiments accomplish this reduction by invoking some combination of (1) shading the light guide's channel so that stray rays cannot enter the light guide's main channel and be directed to the sensor, (2) using a light absorbing surface to absorb off-axis rays rather than passing them on, or (3) angling the entrance to the light guide to reflect off-axis rays back out of the light guide. The net effect of the geometric shading/masking solutions is to generate a mechanically controlled numerical aperture of the light guide opening. Consequently, any combination of (1) various flare geometries, (2) non-reflecting/absorbing flare coatings, and (3) a co-radial chamfered step from a larger internal diameter to a slightly more constricted internal diameter at a location down the light guide's axis from the opening. These geometric solutions terminate many of the internal reflections entering the light guide from off-axis IR sources. It is noted that a sharper/abrupt internal diameter can be used as a co-radial chamfered step, but with greater efficiency, and potentially coupled with the application of a non-reflective coating on the diameter step as with the use of non-reflecting/absorbing flare coatings.

In cases wherein the waveguide's emissivity is constant, the eardrum temperature can be determined by measuring the thermopile observed temperature and then subtracting the effect of the waveguide temperature. If the waveguide is thermally conductive and it is closely and mechanically coupled to the thermopile or a can of the thermopile, the thermistor used in the thermopile package to measure the cold junction temperature of the thermopile should closely match the waveguide temperature. In this way, the system removes the effect of the waveguide optical radiation from the thermopile observed temperature, leaving only the eardrum temperature. The waveguide optical radiation can be determined empirically (e.g., via a regression analysis) to determine the transfer function between eardrum temperature and observed thermopile temperature. As noted above, an optional LWIR lens can be added between the thermopile and waveguide to reduce the percentage of the thermopile's field of view that is filled by the waveguide. This can reduce and possibly even eliminate the need to remove the waveguide's thermal radiation from the thermopile observed measurement.

In an embodiment, the thermal gradient along the light waveguide may cause inaccuracy in the body core temperature prediction. The thermal gradient arises from temperature differences between the tip of the waveguide, which is heated by the ear canal, and the sensor end of the waveguide, which is heated by the ambient environment. An assumption that the ambient temperature is unchanging works well as an approximation when the regression coefficients for the thermopile (IR radiation-induced thermopile hot junction temperature from the eardrum) and the thermistor (cold junction temperature of the thermopile sensor) are chosen based on that one constant ambient temperature. However, when the ambient temperature changes, the waveguide temperature gradient changes, which affects the thermal emission magnitude from the waveguide. This means the regression coefficients are no longer valid, and the accuracy of the body core temperature function will be affected. The standard deviation of the computed target temperature error as viewed through the waveguide could possibly go from approximately 2 degrees C. of error at 25 degrees C. to nearly 4 degrees C. of error at 40 degrees C. This error magnitude is enough to make the predicted body core temperature less valuable with ambient temperatures that are any more than a few degrees different from the ambient temperature at which the regression coefficients were calibrated.

To address this effect from changes in ambient temperature, one can directly (or indirectly) measure the temperature at the light waveguide tip inside the ear canal (using another standoff temperature sensor or a contact sensor such as a thermocouple, thermopile, or a resistance temperature detector (RTD)), and the thermal gradient of the waveguide can be compensated for in the regression coefficients across the range of ambient temperature. Regression coefficients are computed by collecting thermopile hot and cold junction temperatures and waveguide tip temperatures across a known range of target, ambient, and waveguide tip temperatures, and then regression coefficients are computed for each of the measured temperatures. By applying this method, the standard deviation of temperature prediction error across the ambient temperature range of 25 C to 40 C could be improved from nearly 4 degrees C. to less than 1 degree C. This method accounts for differences in ambient temperature and differences in waveguide tip temperature. The waveguide tip temperature can be important when the device is first inserted into the ear, because the tip temperature will first be at room temperature (which is not the same as the eardrum body core temperature), and will slowly warm to ear canal skin temperature.

In different embodiments, the regression analysis can be a linear regression analysis or a regression analysis of higher order. As is known to those of skill in the art, linear regression is a subset of regression analysis that only allows linear terms. In such a regression analysis, there is a truth data point such as a body temperature measurement taken by a reliable instrument. There are also four other temperature measurements. Specifically, a thermopile (or other sensor at the end of the light waveguide that is distant from the tympanic membrane) cold junction temperature, a thermopile hot junction temperature, a thermocouple (or other sensor at the end of the light waveguide that is proximate to the tympanic membrane) cold junction temperature, and a thermocouple hot junction temperature. The true body temperature is treated as a dependent variable that depends on the other four measurements. Data are collected for all five temperature values (i.e., the body temperature, thermopile hot junction temperature, thermopile cold junction temperature, thermocouple hot junction temperature, and thermocouple cold junction temperature), and the collected data as matched data sets are put into a regression analysis program, such as a Matlab regression analysis. The regression analysis generates coefficients $\alpha$, $\beta$, $\gamma$, and $\delta$, and numerical value k, that best match the data for the following function:

$$\text{Body temperature} = \alpha(TP_{Hot}) + \beta(TP_{Cold}) + \gamma(TC_{Hot}) + \delta(TC_{Cold}) + k \quad \text{Equation No. 1}$$

wherein TP represents a thermopile and TC represents a thermocouple. The regression analysis also generates a magnitude of the error for the collected data. This regression analysis is performed over many different systems, which illustrates that the same coefficients can be used for every system, every person, and every condition. After showing that the same coefficients can be used for each system, the coefficients are loaded in every unit and the units then can provide accurate body temperature measurements in all situations. In an alternative embodiment, a user of the system could input their true body temperature when the earpiece is placed into their ear, and the regression calibration could be done for that particular user. In another alternative embodiment, the light waveguide could be pointed at something with a known temperature before each use, and the regression calibration could be calculated using that known temperature.

The light waveguide can be created from low emissivity material to maximize the ratio of internally reflected light to emitted light from the waveguide itself. The waveguide may have high thermal conductivity to minimize the thermal gradient present between the tip (i.e. proximate the tympanic membrane) and the sensor (i.e., distal from the tympanic membrane). The waveguide geometry may be chosen to accommodate a wide range of ear canal physiology. As noted above, the waveguide may have a cup or can that fully encompasses the thermopile sensor to restrict its field of view to light that is either emitted by the waveguide or emitted into the tip of the waveguide from the tympanic membrane. The waveguide may be made from machined or bent aluminum or copper. Copper is easy to coat with gold, which is a low emissivity material that will not oxidize. When the waveguide is a hollow copper tube, the interior of the copper tube can be coated with gold. The gold coating also generally helps with oxidative resistance. The waveguide could also be an optic fiber. The waveguide tip temperature may be measured by a thermocouple, an RTD, or a thermistor. The thermopile and waveguide tip temperature sensors may both be routed to the same analog to digital converter to digitize the measurements, and the digitized measurements may then be fed into an equation (such as Equation No. 1) with the calibrated regression coefficients to determine the target (eardrum) temperature.

Figure 2:
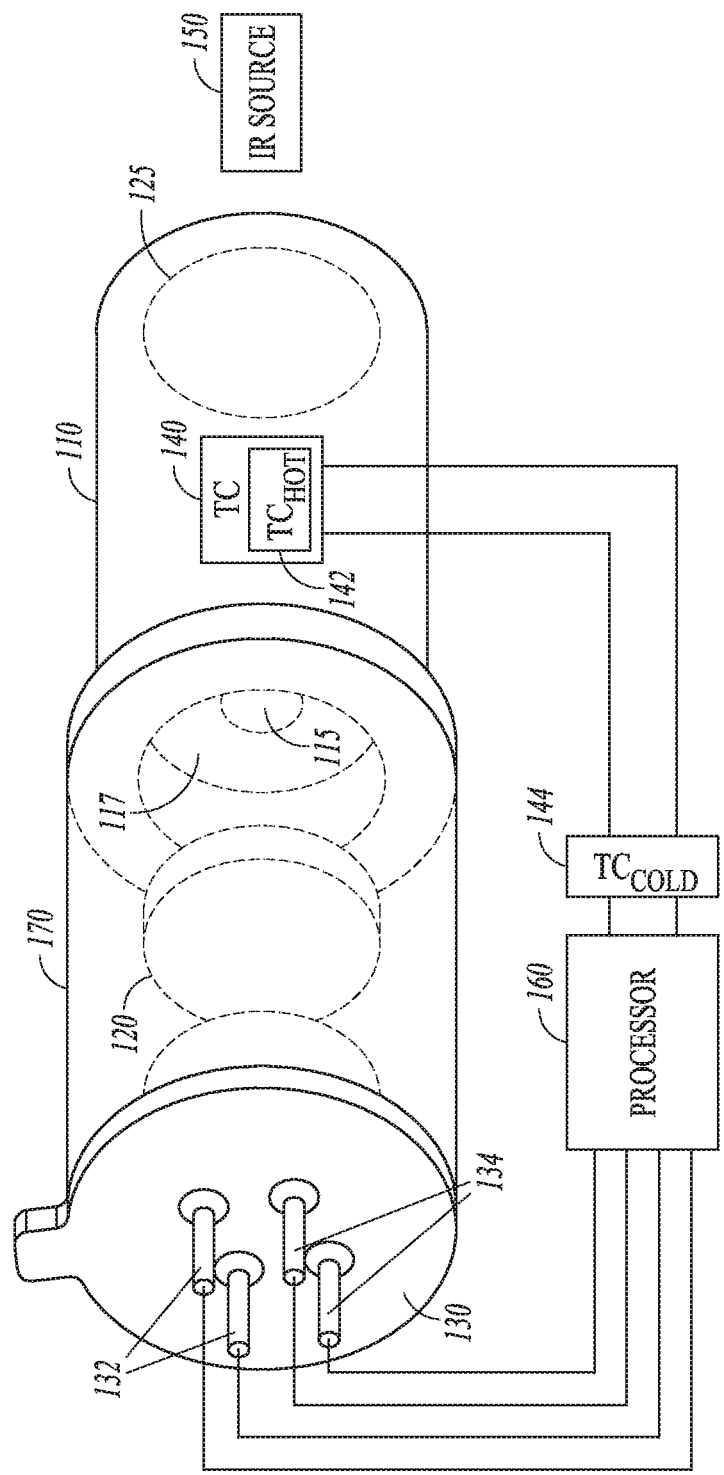
FIG. 2 illustrates another embodiment of a system and apparatus that is placed into an ear and that determines a body core temperature.

FIG. 1 is a block diagram illustrating an embodiment of a system and apparatus that is placed into an ear and that determines a body core temperature. The system includes a light waveguide 110, an optional lens 120, a thermopile (or other temperature sensing device) 130, and a thermocouple (or other temperature sensing device) 140. The waveguide 110 in an embodiment can be about 20 mm long and about 2 mm in diameter, and includes a waveguide hole 115 that traverses the length of the waveguide. The apparatus, and in particular the thermopile 130 and thermocouple 140, is coupled to a processor 160. Specifically, the hot junction 132 and cold junction 134 of the thermopile, and the hot junction 142 and the cold junction 144 of the thermocouple are coupled to the processor 160. The apparatus is placed next to an IR source 150, such as a tympanic membrane. As noted above, a true temperature of the IR source is obtained, and the system is calibrated over a temperature gradient using the hot and cold junctions 132, 134, 142, and 144 of the thermopile 130 and thermocouple 140. In an embodiment, the apparatus further includes a lens 120, which reduces the field of view of the sensor that is occupied by the light waveguide. In another embodiment, the apparatus can include a second lens or aperture 125. The end of the waveguide can also include a can, container, or protective housing 170 as illustrated in FIG. 2 that, in conjunction with the waveguide's reduction in diameter from the thermopile diameter to the final exit diameter of the waveguide presenting the flat surface 117 to the thermopile sensor (i.e., a step change in diameter), further limits the infrared radiation from the ambient environment that is sensed by the thermopile. The apparatus can be coupled to a hollow sound tube 135 of an earpiece of a communication device.

Figure 8A:
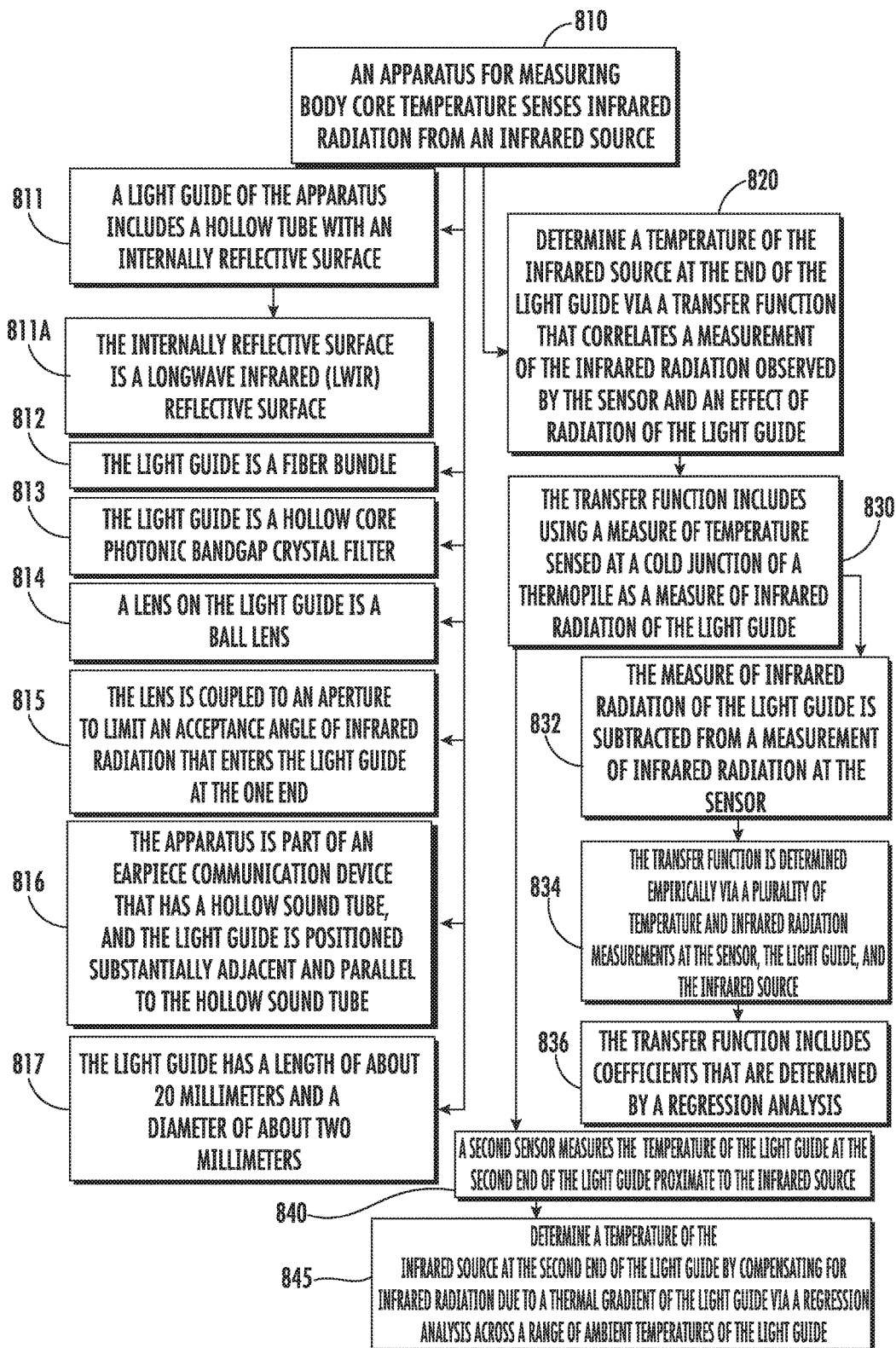
FIGS. 8A and 8B are a block diagram illustrating features and operations of a system and apparatus that is placed into an ear and that determines a body core temperature.
Figure 8B:
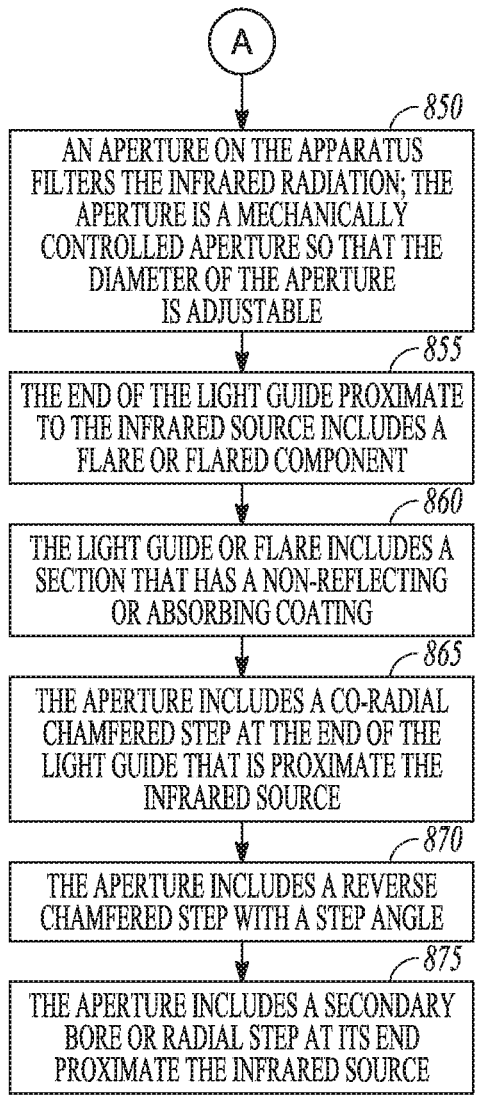

FIG. 8 is a block diagram illustrating features and operations of systems and apparatuses that are placed into an ear and that determines a body core temperature. FIG. 8 includes a number of process blocks 810-875. Though arranged substantially serially in the example of FIG. 8, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 8, at 810, an apparatus for measuring body core temperature senses infrared radiation from an infrared source. In an embodiment, the apparatuses of FIGS. 1 and/or 2 can be used to sense the infrared radiation. Specifically, the light guide of the apparatus, which can be a hollow tube and which can include an internally reflective surface (811) such as a longwave infrared (LWIR) reflective interior (811A), or which can be a fiber bundle (812), senses the infrared radiation from the infrared source (such as a tympanic membrane) at the one end of the light guide. The light guide can be also be a hollow core photonic bandgap crystal filter (813). The infrared radiation is filtered through a lens or aperture (125). The lens can be a ball lens (814). When a lens is used, the lens also serves to keep debris and contaminants from entering the hollow light guide. The lens can be coupled with an aperture to limit an acceptance angle of infrared radiation that enters the light guide at the one end (815). The infrared radiation is propagated via the light guide to the opposite end of the light guide, and a sensor positioned at the opposite end of the light guide senses the infrared radiation. In another embodiment, the apparatus is part of an earpiece communication device that has a hollow sound tube, and the light guide is positioned substantially adjacent and parallel to the hollow sound tube (816). In yet another embodiment, the light guide has a length of about 20 millimeters and a diameter of about 2 millimeters (817). At 820, a processor coupled to the sensor at the opposite end of the light guide determines a temperature of the infrared source at the other end of the light guide via a transfer function that correlates a measurement of the infrared radiation observed by the sensor and an effect of radiation of the light guide.

As indicated at 830, the transfer function of operation block 820 includes using a measure of temperature sensed at a cold junction of a thermopile as a measure of infrared radiation of the light guide. At 832, the measure of infrared radiation of the light guide is subtracted from a measurement of infrared radiation at the sensor. As is known to one of skill in the art, a cold temperature of a thermopile is a contact measurement and therefore measures temperature. As is also known to those of skill in the art, a hot junction of the thermopile can explicitly measure infrared radiation. The light guide and the temperature sensor should have good mechanical coupling, and therefore should be at the same temperature. At 834, the transfer function is determined empirically via a plurality of temperature and infrared radiation measurements at the sensor, the light guide, and the infrared source. It is worth noting here that not all of the measurements will be of infrared radiation. As indicated at 834, some measurements will be of temperature. Specifically, in an embodiment, the light guide is a direct contact temperature measurement that allows compensation for the infrared radiation of the light guide that is picked up by the sensor via the hot junction of the thermopile. At 836, and as explained above, the transfer function includes coefficients that are determined by a regression analysis. The regression analysis can be a linear regression analysis.

In another embodiment, the apparatus for measuring body core temperature, in addition to the first sensor that is positioned at the end of the light guide distal from the infrared source, includes a second sensor that is positioned at the end of the light guide proximate to the infrared source. A computer processor is coupled to both the first sensor and the second sensor. At 840, the second sensor measures the temperature of the light guide at the second end of the light guide proximate to the infrared source. At 845, the processor determines a temperature of the infrared source at the second end of the light guide by compensating for infrared radiation due to a thermal gradient of the light guide via a regression analysis across a range of ambient temperatures of the light guide.

As noted above, the infrared radiation entering the light guide can be filtered by a lens and/or aperture 125. The aperture can be a standalone device or it can be used in conjunction with a lens. The aperture can also be a mechanically controlled aperture, so that the diameter of the aperture is adjustable (850).

In an embodiment, the end of the light guide proximal to the infrared source includes a flare or flared component 430 (855). The flare rejects light from angles of incidence, thereby minimizing the amount of incident light that is able to internally reflect and propagate down the light guide. This is illustrated in FIG. 4, wherein ray 410 initially contacts the flare surface at point 410A, reflects off of the surface and then contacts point 410B, and then reflects and exits the flare without entering the light guide. In a related embodiment as illustrated in FIG. 4A, the light guide or flare includes a section that has a non-reflecting or absorbing coating 420 (860). The non-reflecting or absorbing coating prevents the reflection and propagation of wide-angle incident light (that is, incident light that is outside of the boundary of the infrared source and hence not originating from the infrared source), thereby preventing such wide-angle incident light from entering the light guide.

Figure 5:
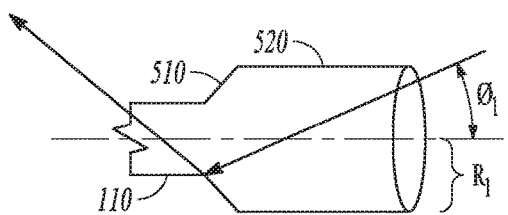
FIG. 5 illustrates another embodiment of a system and apparatus that is placed into an ear and that determines a body core temperature wherein a light guide includes a flared section and straight section combination.
Figure 5A:
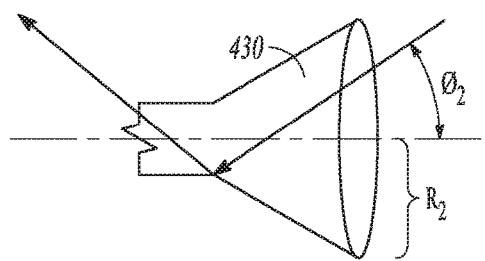
FIG. 5A illustrates another embodiment of a system and apparatus that is placed into an ear and that determines a body core temperature wherein a light guide includes a flared section.

A variation of the flared component of FIGS. 4 and 4A is illustrated in FIG. 5, wherein a smaller flared section 510 is coupled to an extended non-flared section 520. The extended non-flared section 520 cuts down on the range of wide-angle incident light that can enter the light guide. This can be seen by a comparison to FIG. 5A, wherein the angle $ø_2$ is greater than $ø_1$, and $r_2$ is greater than $r_1$, such that a smaller angle of incident light can enter the light guide in the embodiment of FIG. 5 as compared to the embodiment of FIG. 5A. The combination of angle $ø_2$ and the axial length of flared component 430 can be used to engineer a specific numerical aperture of the opening of flared component 430. Also, the length of 520 in combination with $r_1$ and the diameter of 110 can be used to engineer the specific numerical aperture of the component 520.

Figure 6:
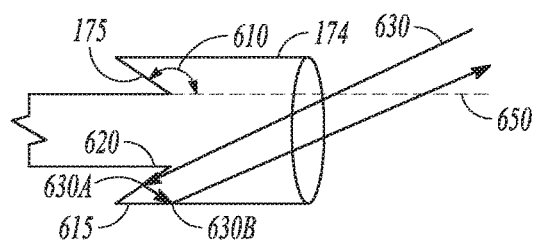
FIG. 6 illustrates another embodiment of a system and apparatus that is placed into an ear and that determines a body core temperature wherein a light guide includes a reverse chamfered step with a step angle.

In another embodiment, the aperture includes a step at the end of the light guide that is proximate the infrared source (865). Such a step is illustrated in FIG. 3, wherein the step 310 forms an aperture 320 that has a diameter 325 that is greater that the diameter 330 of the light guide 110. The length of 170 in combination with the step size difference from 325 to 330 is the manner in which the numerical aperture is mechanically controlled to engineer a specific field of view. As can be seen from FIG. 3, a wide-angle incident light ray 340 will contact the aperture at points 342 and 344, and then be reflected out of the aperture and not enter the light guide. FIG. 3 further shows that a light ray 350 will contact the aperture at 352 and 354, and it will enter and contact the light guide at 356, but at this point it will be attenuated and not contribute greatly to the light sensed by the sensor. In a related embodiment, the aperture includes a reverse chamfered step with a step angle (870). This is illustrated in FIG. 6, wherein the light guide and aperture form a reverse step angle 610 that is greater than 90° as measured counterclockwise from an axis 650. As further illustrated in FIG. 6, the diameter section 615 of the light guide overlaps along the diameter section 620 at the end of the light guide. This structure causes a light ray 630 to reflect off points 630A and 630B and exit the aperture without entering the light guide. The length of segment 174 in combination with angle 610, and the difference in diameter between segment 174 and segment 620, is how the numerical aperture is mechanically controlled to engineer a specific field of view.

Figure 7:
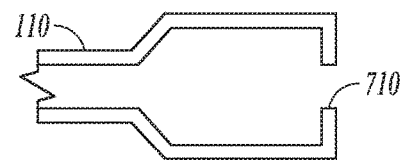
FIG. 7 illustrates another embodiment of a system and apparatus that is placed into an ear and that determines a body core temperature wherein light guide includes a secondary bore at one end.

In another embodiment, the aperture includes a secondary bore or radial step at its end proximate the infrared source (875). As illustrated in FIG. 7, the secondary bore 710 (or radial step) is located on the infrared source side of the light guide, and with its smaller diameter than the light guide serves to limit the amount of wide-angle incident light that enters the light guide. In an embodiment, this secondary bore 710 is also smaller than the infrared radiation source 150, thereby functioning to further limit the possibility that wide angle incident light will pass through the aperture and enter the light guide.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. An apparatus for measuring body core temperature comprising:
   a light guide comprising an internally reflective tube, the light guide coupled to an earpiece, the light guide having a first end and a second end, and the light guide comprising an aperture positioned at the second end;
   a first sensor positioned at the first end of the light guide; and
   a processor coupled to the first sensor;
   wherein the first sensor is operable to sense infrared radiation from an infrared source at the second end of the light guide; and
   wherein the processor is configured to determine a temperature of the infrared source at the second end of the light guide via a transfer function that correlates a measure of the infrared radiation observed by the first sensor and an effect of radiation of the light guide;
   wherein the second end of the light guide comprises a flared component, wherein the flared component is operable to reject light from angles of incidence, thereby minimizing an amount of light that is able to internally reflect and propagate down the light guide.

2. The apparatus of claim 1, wherein the light guide comprises a hollow internally reflective tube.

3. The apparatus of claim 2, comprising a lens covering the aperture at the second end of the light guide, thereby preventing a contaminant from entering the light guide.

4. The apparatus of claim 2, wherein the light guide comprises a hollow core photonic bandgap crystal filter.

5. The apparatus of claim 1, wherein the aperture limits an acceptance angle of infrared radiation that enters the light guide at the second end.

6. The apparatus of claim 1, comprising a ball lens positioned at the aperture.

7. The apparatus of claim 1, wherein the light guide comprises a fiber bundle.

8. The apparatus of claim 1, comprising a second sensor positioned at the second end of the light guide, the second sensor coupled to the processor;
   wherein the second sensor is operable to measure a temperature of the light guide at the second end of the light guide; and
   wherein the processor is operable to determine a temperature of the infrared source at the second end of the light guide by compensating for infrared radiation due to a thermal gradient of the light guide via a regression analysis across a range of ambient temperatures of the light guide.

9. The apparatus of claim 1, wherein the sensor comprises a thermopile;
   wherein the transfer function comprises using a measurement of temperature sensed at a cold junction of the thermopile as a measurement of infrared radiation of the light guide, and subtracting the measurement of infrared radiation of the light guide from a measurement of infrared radiation at the sensor;
   wherein the transfer function is determined empirically via a plurality of temperature and infrared radiation measurements at the first sensor, the light guide, and the infrared source; and
   wherein the transfer function comprises coefficients determined by a regression analysis.

10. The apparatus of claim 1, wherein the light guide comprises a longwave infrared (LWIR) reflective interior; and wherein the earpiece comprises a communication device and a hollow sound tube, and wherein the light guide is positioned substantially adjacent and parallel to the hollow sound tube.

11. The apparatus of claim 1, wherein e light guide comprises a length of about 20 millimeters and a diameter of about 2 millimeters.

12. An apparatus for measuring body core temperature comprising:
    a light guide comprising an internally reflective tube, the light guide coupled to an earpiece, the light guide having a first end and a second end, and the light guide comprising an aperture positioned at the second end;
    a first sensor positioned at the first end of the light guide; and
    a processor coupled to the first sensor;

wherein the first sensor is operable to sense infrared radiation from an infrared source at the second end of the light guide; and wherein the processor is configured to determine a temperature of the infrared source at the second end of the light guide via a transfer function that correlates a measure of the infrared radiation observed by the first sensor and an effect of radiation of the light guide;

wherein the light guide comprises a hollow tube, and an internal surface of the hollow tube at the second end comprises a section having a non-reflecting or absorbing coating in order to reject reflection and propagation of wide-angle incident light.

13. The apparatus of claim 12, wherein the aperture comprises a mechanically controlled numerical aperture at the second end of the light guide.

14. The apparatus of claim 12, wherein the second end of the light guide comprises a flared component, wherein the flared component is operable to reject light from angles of incidence, thereby minimizing an amount of light that is able to internally reflect and propagate down the light guide.

15. The apparatus of claim 12, wherein the aperture comprises a co-radial chamfered step at the second end of the light guide, such that a diameter of the second end of the light guide is greater than a diameter of the light guide.

16. The apparatus of claim 12, wherein the aperture comprises a reverse chamfered step with a step angle, such that the step angle is greater than 90° as measured within a confine of the light guide, and a diameter section at the second end of the light guide overlaps along the light guide with that of a smaller internal diameter of the light guide.

17. The apparatus of claim 12, wherein the aperture comprises a radial step at the second end of the light guide, such that the second end of the light guide comprises a first larger internal diameter and a second smaller internal diameter.

18. The apparatus of claim 12, comprising a second sensor positioned at the second end of the light guide, the second sensor coupled to the processor;

wherein the second sensor is operable to measure a temperature of the light guide at the second end of the light guide; and wherein the processor is operable to determine a temperature of the infrared source at the second end of the light guide by compensating for infrared radiation due to a thermal gradient of the light guide via a regression analysis across a range of ambient temperatures of the light guide.

19. The apparatus of claim 12, wherein the first sensor comprises a thermopile;

wherein the transfer function comprises using a measurement of temperature sensed at a cold junction of the thermopile as a measurement of infrared radiation of the light guide, and subtracting the measurement of infrared radiation of the light guide from a measurement of infrared radiation at the sensor;

wherein the transfer function is determined empirically via a plurality of temperature and infrared radiation measurements at the first sensor, the light guide, and the infrared source; and wherein the transfer function comprises coefficients determined by a regression analysis.

* * * * *